US009262922B2

(12) United States Patent
Song et al.

(10) Patent No.: US 9,262,922 B2
(45) Date of Patent: Feb. 16, 2016

(54) PARKING MANAGEMENT SYSTEM INCLUDING RAIL

(71) Applicant: CHANG SHIN INFOTEL CO., LTD., Daejeon (KR)

(72) Inventors: Dongsoo Song, Daejeon (KR); Jaegu Baek, Suwon-si (KR); Jaesung Lee, Chungju-si (KR); Taeheon Kang, Daejeon (KR)

(73) Assignee: CHANG SHIN INFOTEL CO., LTD., Daejeon (KR)

( * ) Notice: Subject to any disclaimer, the term of this patent is extended or adjusted under 35 U.S.C. 154(b) by 256 days.

(21) Appl. No.: 14/090,724

(22) Filed: Nov. 26, 2013

(65) Prior Publication Data

US 2014/0152824 A1    Jun. 5, 2014

(30) Foreign Application Priority Data

Dec. 5, 2012    (KR) .......................... 10-2012-0140277

(51) Int. Cl.
*G08G 1/14*    (2006.01)
*F16M 11/18*    (2006.01)
*F16M 11/42*    (2006.01)
*F16M 13/02*    (2006.01)

(52) U.S. Cl.
CPC .............. *G08G 1/141* (2013.01); *F16M 11/18* (2013.01); *F16M 11/425* (2013.01); *F16M 13/027* (2013.01)

(58) Field of Classification Search
CPC ....................................................... G08G 1/141

USPC ......................................... 348/148; 340/932.2
See application file for complete search history.

(56) References Cited

U.S. PATENT DOCUMENTS

| | | | | |
|---|---|---|---|---|
| 2003/0004792 A1* | 1/2003 | Townzen | ................. | G07B 15/00 705/13 |
| 2007/0085067 A1* | 4/2007 | Lewis | ................... | E01F 13/065 256/73 |
| 2009/0053025 A1* | 2/2009 | Venkatraman | ............ | E04H 6/24 414/229 |
| 2011/0121083 A1* | 5/2011 | Voigtlaender | ........ | G06K 19/047 235/492 |
| 2012/0095812 A1* | 4/2012 | Stefik | ..................... | G06Q 10/02 705/13 |
| 2014/0104422 A1* | 4/2014 | Choi | ...................... | G08G 1/143 348/148 |

* cited by examiner

*Primary Examiner* — Jay Patel
*Assistant Examiner* — Yulin Sun
(74) *Attorney, Agent, or Firm* — Drinker Biddle & Reath LLP (57) ABSTRACT

A parking management system including a rail is described. A camera module takes images of a parking area, has a chargeable battery, and moves along the rail using a motor and wheels. A charging and AP module charges the camera module, receives image information from the camera module, and is movable using a motor, a running rail and gears. A server processes the image information received from the charging and AP module. A computer is connected to the server, and contains management software which executes a parking situation search using a database of the server. The camera takes images from the parking area while moving along the rail, and is positioned on the charging rail so as to be charged from the charging and AP module.

8 Claims, 6 Drawing Sheets

PARKING MANAGEMENT SYSTEM INCLUDING RAIL

CROSS-REFERENCE TO RELATED APPLICATION

This application claims the priority of Korean Patent Application No. 10-2012-0140277, filed Dec. 5, 2012 in the Korean Intellectual Property Office, which is incorporated herein by reference in its entirety.

FIELD OF THE INVENTION

Embodiments relate to a parking management system including a rail, and more particularly, to a parking management system including a rail which takes images of a parking area of a parking lot using a camera module which has a chargeable battery and moves along the rail.

BACKGROUND

As apartments, department stores and large shopping malls are concentrated in cities, parking in cities is becoming more problematic. In particular, it is typical to design high buildings to have underground parking lots since they lack ground areas that can be used as parking lots.

In order to efficiently manage such underground parking lots, it is required to provide a service of introducing a vehicle that enters through the entrance of a parking lot to a vacant parking area, notifying the position of a parked vehicle to a vehicle owner by recognizing the registration number of the parked vehicle, or the like.

According to a current parking management system, parking concierges find vacant parking areas or the like by moving about the parking lot and guide a vehicle which has just entered the parking lot to a vacant parking area. In this system, however, significant labor is required and it is difficult to inspect and manage a number of parking areas. There is a method of installing sensors and/or cameras in each parking area in order to determine whether or not each parking area is vacant and recognize the registration number of a parked vehicle. However, installation is not easy and installation cost is expensive, which are problematic.

In order to reliably run a camera module which runs on a rail, the problem of supplying power to the camera module must be overcome. When the power is supplied through chords, the distribution of wires becomes complicated since the rail is long. It is also difficult to properly operate the camera using a small driving device such as a small motor.

The information disclosed in the Background section is only for the enhancement of understanding of the background of the invention, and should not be taken as an acknowledgment or any form of suggestion that this information comprises prior art that would already be known to a person skilled in the art.

SUMMARY

Embodiments have been made keeping in mind the above problems occurring in the related art, and the invention is intended to allow a camera module for taking images from a parking area to efficiently move on a rail and the camera module to be efficiently charged with power, thereby improving the efficiency of management of a parking lot.

One embodiment provides a parking management system that includes a camera module which comprises a camera section which collects image information by taking images from a parking area while moving along a rail; a communicating section which receives the image information collected at the camera section and transmits the image information to an outside via a wireless network; a wheel driving section which includes a motor, the wheel driving section generating rotation using the motor and transmitting the rotation to wheels of the camera module; and a power source section which receives power from an outside source, stores the power, and supplies the power to the camera section, the communicating section or the motor of the wheel driving section, wherein the power is charged from the outside source. The parking management system further comprises a charging and access point (AP) housing which includes a charging and AP module which comprises a charging section which charges the power source section of the camera module, an AP module which establishes a wireless network or a wired network and receives the image information from the communicating section of the camera module through the wireless network, a gear driving section which includes a motor, the gear driving section generating rotation using the motor and transmitting the rotation to a gear, and a power source section which supplies power to the charging section, the AP module and the motor of the gear driving section; a running rail positioned collinear with the rail; and a charging rail positioned between the charging and AP module and the running rail. The parking management system further comprises: a server comprising a database, wherein the server receives the image information from the AP module of the charging and AP housing through the wired network, processes the received image information, and stores a result of the processing in the database; and at least one computer connected to the server, wherein the at least one computer contains management software which executes a parking situation search using the database of the server.

In an embodiment the rail on which the camera section moves may include a first planar portion parallel to a direction in which the camera module proceeds and a second planar portion connected perpendicularly to the first planar portion.

The second planar portion may be connected to a middle portion of the first planar portion.

The rail may further comprise a third planar portion connected perpendicularly to an edge of the second planar portion which is not connected to the first planar portion, the first and third planar portions being positioned parallel to each other.

The wheels of the camera module may be positioned to adjoin an upper surface of the first planar portion of the rail and both surfaces of the second planar portion of the rail.

The camera module may further comprise: a camera module support frame which comprises a middle planar portion and two outer planar portions connected perpendicular to the middle planar portion, wherein the camera module is mounted on an upper surface of the middle planar portion; and wheel connecting parts connected to one planar portion of the planar portions of the camera module support frame and the wheels, thereby fixing the wheels to the camera module support frame.

The charging and AP housing may comprise: a first bottom part positioned at a bottom of the charging and AP housing, wherein the first bottom part comprises a circular gear which has gear teeth on a circumference of a disk thereof; and a second bottom part positioned below the first bottom surface, wherein the second bottom surface comprises gear teeth formed on a planar surface thereof, the gear teeth of the second bottom surface corresponding to the gear teeth of the circular gear.

The power source section of the charging and AP module may supply the power to the charging section, the AP module and the gear driving section via wired power lines, based on power over Ethernet (PoE) using local area network (LAN) lines, or a wireless medium. The charging section of the charging and AP module may charge the power source section of the camera module via a wireless or wired medium.

The camera module takes images from the parking area while moving along the rail. Since the charging and AP housing is moved, the camera module is positioned on the charging rail and charged from the charging and AP module. It is therefore possible to reduce installation cost and space for cameras.

BRIEF DESCRIPTION OF THE DRAWINGS

The above and other objects, features and advantages of the invention will be more clearly understood from the following detailed description when taken in conjunction with the accompanying drawings, in which.

DETAILED DESCRIPTION

Reference will now be made in greater detail to exemplary embodiments of the invention so that those skilled in the art to which the invention relates can easily put the invention into practice. While the invention will be described in conjunction with exemplary embodiments thereof, it is to be understood that the invention can be embodied in a variety of different forms and is not limited to the embodiments described herein. In the following description of the invention, detailed descriptions of known functions and components incorporated herein will be omitted when they may make the subject matter unclear. Wherever possible, the same reference numerals will be used throughout the drawings and the description to refer to the same or like parts.

A description will be given of a parking management system using a rail according to an embodiment of the invention with reference to the accompanying drawings.

Figure 1:
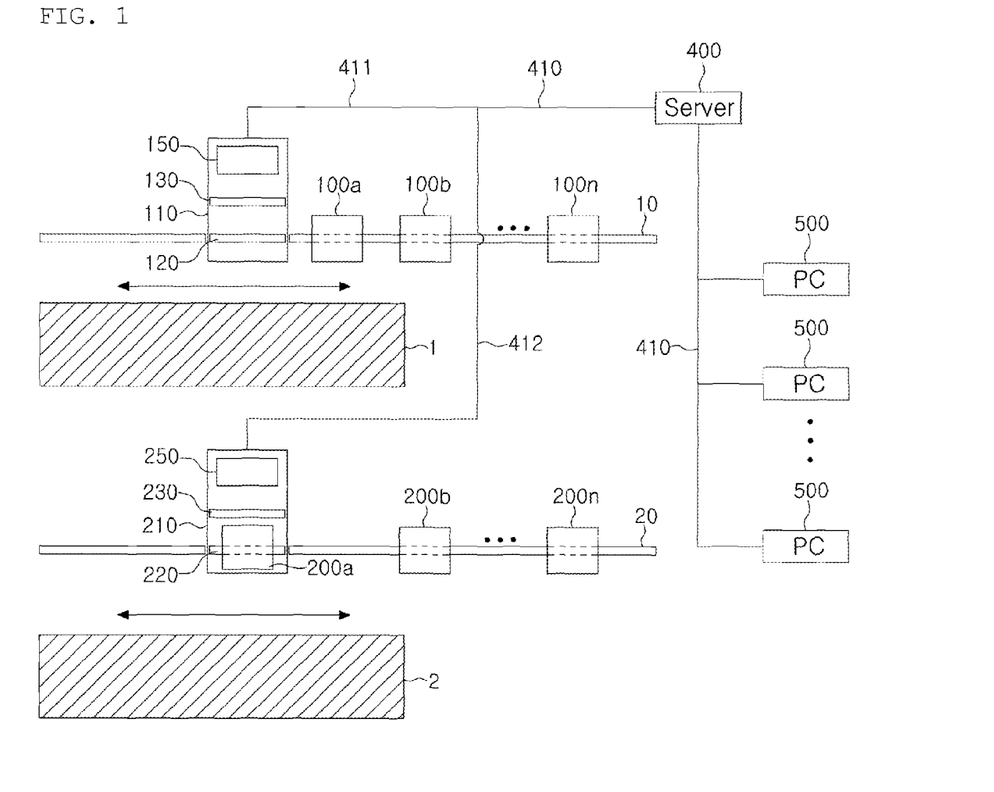
FIG. 1 is a top-plan view showing a parking management system using a rail according to an embodiment of the invention.

Referring to FIG. 1, the parking management system using a rail according to an embodiment of the invention comprises a rail 10 positioned in one direction to correspond to the direction in which one parking area 1 is formed, camera modules 100a, 100b, . . . , and 100n which are movable along the rail 10, a charging and AP housing 110 positioned on the rail 10, a server 400 connected with the charging and AP housing 110 via wired networks 410 and 411, and a computer (PC) 500 connected to the server 400 via the wired network 410.

As the camera modules 100a, 100b, . . . and 100n and the charging and AP housing 110 are positioned on one parking area 1, other camera modules 200a, 200b, . . . and 200n and another charging and AP housing 110 210 are positioned on another parking area 2.

As the camera modules 100a, 100b, . . . and 100n and 200a, 200b, . . . and 200n and the charging and AP housing 110s 110 and 210 are correspondingly positioned on the parking areas 1 and 2, the embodiment may further comprise parking areas as well as camera modules and charging and AP housing 110s corresponding to the parking areas. In the following embodiment, reference will be made in conjunction with the single parking area 1 as well as the camera module 100a and the charging and AP housing 110 corresponding to the parking area 1.

The parking area 1 is an area of a bottom surface of the parking lot which is marked by lines such that a vehicle can park therein, and is formed in one direction.

The rail 10 is connected to the ceiling of the parking lot or positioned adjacent to the ceiling, and is disposed along the direction in which the parking area 1 is formed. The rail 10 can be oriented in a direction perpendicular or oblique with respect to the parking area 1. In one embodiment, it is preferred that the rail 10 be positioned in an oblique direction in order to detect the number plate of a vehicle parked on the parking area 1.

At least one camera module of the camera modules 100a, 100b, . . . and 100n is to move in the direction of the rail 10.

Figure 2:
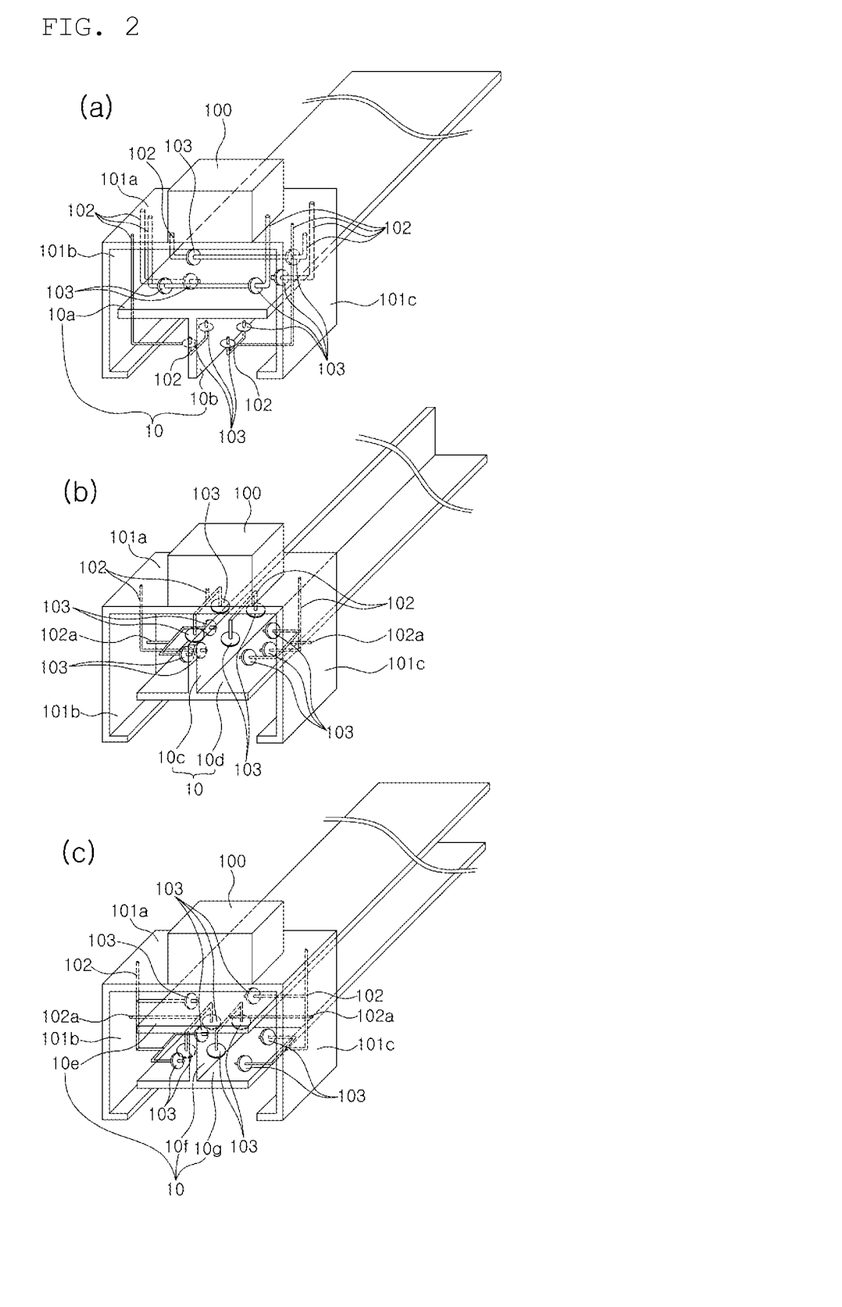
FIG. 2A, FIG. 2B and FIG. 2C are perspective views showing the camera module which moves on the rail.

With reference to FIG. 2A, FIG. 2B and FIG. 2C, a description will be given to a camera module 100 positioned on the rail 10. The camera module 100 is positioned on the rail 10 through a camera module support frame 101 and at least one wheel 103.

First, describing with reference to FIG. 2A, the rail 10 has a horizontal plate 10a which is elongated in the direction in which the camera module 100 is to move and is positioned parallel to the camera module 100. The rail 10 also has another plate 10b connected perpendicularly to the bottom surface of the horizontal plate 10a.

The plate 10b connected to the bottom surface of the horizontal plate 10a is also elongated in the direction in which the camera module 100 is to move, and is connected to the middle bottom portion of the horizontal plate 10a such that the rail 10 has a Y-shaped cross-section.

The camera module support frame 101 which is positioned to surround the upper part of the rail 10 having the above-described shape includes planar portions 101a, 101b and 101c, and the camera module 100 is mounted on the top surface of at least one planar portion 101a.

According to an embodiment shown in FIG. 2A to FIG. 2C, it is preferred that the camera module support frame 101 have three planar portions 101a, 101b and 101c in which the two planar portions 101b and 101c are connected perpendicular to the middle planar portion 101a. That is, the planar portions 101a and 101b are perpendicular to each other, and the planar portions 101a and 101c are perpendicular to each other.

Wheel connecting parts 102 are connected to the inner surface of the camera module support frame 101, and wheels 103 are provided on free ends of the wheel connecting parts 102 which are not connected to the inner surface of the camera module support frame 101.

In an embodiment shown in FIG. 2A, wheels 103 connected to the free ends of the wheel connecting parts 102 are positioned such that they adjoin the top and bottom surfaces of the horizontal plate 10a of the rail 10, and are positioned such that they adjoin both side surfaces of the plate 10b of the rail 10 connected to the horizontal plate 10a.

The wheels 103 comprise four wheels 103 which adjoin the top surface of the horizontal plate 10a of the rail 10, two wheels 103 which adjoin the bottom surface of the horizontal plate 10a, and two wheels 103 which adjoin either side surface of the plate 10b connected to the horizontal plate 10a. A total of ten wheels 103 adjoin the surfaces of the rail 10 such that the camera module support frame 101 on which the camera module 100 is mounted can move along the rail 10 without shaking.

Referring to FIG. 2B, the rail 10 has a vertical plate 10c which is elongated in the direction in which the camera module 100 is to move and is positioned perpendicular to the camera module 100. The rail 10 also has another plate 10d connected perpendicularly to the bottom surface of the horizontal plate 10a.

The plate 10d connected to the bottom surface of the vertical plate 10c is also elongated in the direction in which the camera module 100 is to move, and is connected to the bottom portion of the vertical plate 10c such that the rail 10 has an upside-down Y-shaped cross-section.

The rail 10 shown in FIG. 2B has the above-described shape, and the camera module support frame 101 which is positioned to surround the upper part of the rail 10 is configured the same as that shown in FIG. 2A.

The wheels 103 disposed at the free ends of the wheel connecting parts 102 connected to the inner portions of the camera module support frame 101 are positioned such that they adjoin both side surfaces of the vertical plate 10c of the rail 10 and the top and bottom surfaces of the plate 10d of the rail 10 connected to the bottom portion of the vertical plate 10c.

The wheels 103 comprise four wheels 103 which adjoin both side surfaces of the vertical plate 10c of the rail 10, four wheels 103 which adjoin the top surface of the plate 10d of the rail 10 connected to the vertical plate 10c, and two wheels 103 which adjoin the bottom surface of the plate 10d. A total of ten wheels 103 adjoin the surfaces of the plates 10c and 10d of the rail 10 such that the camera module support frame 101 on which the camera module 100 is mounted can move along the rail 10 without shaking.

The rail 10 and the wheels 103 according to another embodiment will be described with reference to FIG. 2C. The rail 10 has a plate 10e which is elongated in the direction in which the camera module 100 is to move and is positioned parallel to the camera module 100 (hereinafter referred to as the "first plate 10e"). The rail 10 also has a plate 10f connected perpendicularly to the bottom middle portion of the first plate 10e (hereinafter referred to as the "second plate 10f") and a plate 10g connected perpendicularly to the bottom portion of the second plate 10f (hereinafter referred to as the "third plate 10g").

The shape of the rail 10 corresponds to the shape of an "I."

The wheels 103 disposed at the free ends of the wheel connecting parts 102 connected to the inner portions of the camera module support frame 101 are positioned such that they adjoin the top surface of the first plate 10e of the rail 10, both side surfaces of the second plate 10f and the top surface of the third plate 10g.

The wheels 103 comprise two wheels 103 which adjoin the top surface of the first plate 10e, four wheels 103 which adjoin both side surfaces of the second plate 10f, and four wheels 103 which adjoin the upper surface of the third plate 10g. A total of ten wheels 103 adjoin the surfaces of the plates 10e, 10f and 10g of the rail 10 such that the camera module support frame 101 on which the camera module 100 is mounted can move along the rail 10 without shaking.

In the embodiments described with reference to FIG. 2A to FIG. 2C, the wheel connecting parts 103 can be connected to the inside of the middle planar portion of the camera module support frame 101. As shown in FIG. 2B, the wheel connecting parts 103 can be connected to the inside of the side planar portion 101c of the camera module support frame 101.

Figure 3:
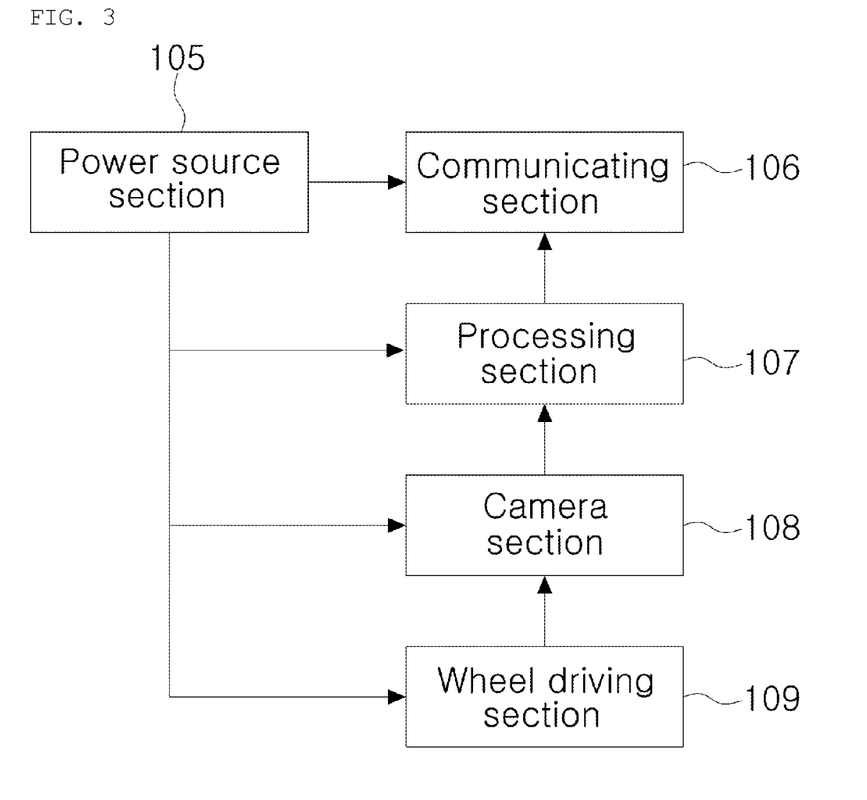
FIG. 3 is a block diagram showing the structure of the camera module.

The structure of the camera module 100 will be described in more detail with reference to FIG. 3.

The camera module 100 is a structure mounted on the top portion of the camera module support frame 101 which is previously described with reference to FIG. 2A to FIG. 2C, and includes a power source section 105, a communicating section 106, a processing section 107, a camera section 108 and a wheel driving section 109.

The camera section 108 takes images from the parking area and collects image information. The communicating section 106 has a communication module which can perform wireless communication, and transmits the image information collected at the camera section 108 to the outside through a wireless network.

The communicating section 106 transmits the image information to the outside through Wifi, Bluetooth or Zigbee.

The processing section 107 receives the image information collected at the camera section 108, processes the image information, and sends the processed image information to the communicating section 106. In an embodiment, the processing section 107 executes image processing of compressing or converting the image information.

The wheel driving section 109 has a motor. The motor generates rotation using power supplied from the outside, and transmits the rotation to the wheels 103 through the wheel connecting parts 102.

The power source section 105 is connected to each of the communicating section 106, the processing section 107, the camera section 108 and the wheel driving section 109. The power source section 105 receives power from the outside, stores the received power, and supplies the stored power to the communicating section 106, the processing section 107, the camera section 108 and the wheel driving section 109 each of which is connected thereto.

When the power source section 105 supplies power to the power supplying section 109, the power supplied from the power source section 105 is sent to the motor of the wheel driving section 109.

The power source section 105 can be charged by an external charging section via a wireless or wired medium.

Figure 4:
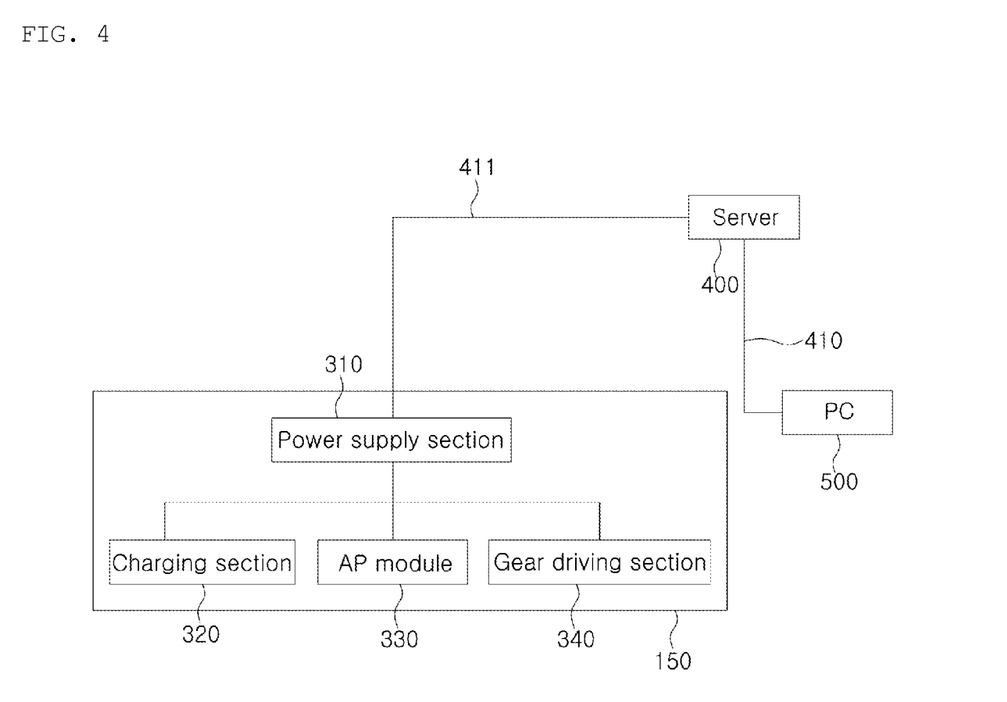
FIG. 4 is a block diagram showing the structure of a charging and AP housing and a server.
Figure 5:
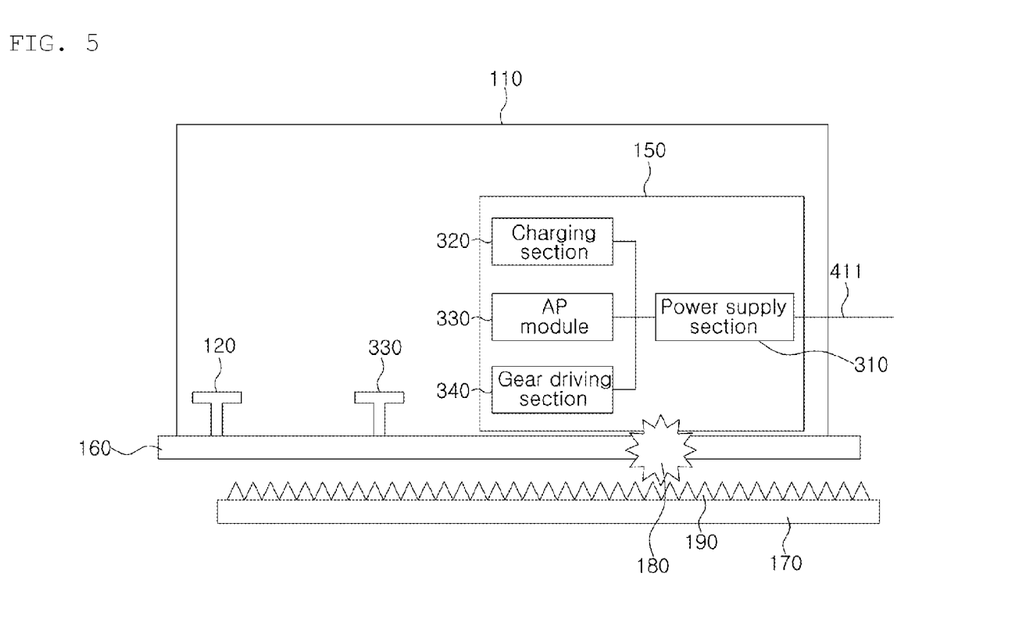
FIG. 5 is a schematic view showing that the charging and AP housing horizontally moves through gears.

The structure of the charging and AP housing 110 will be described below with reference to FIG. 4 and FIG. 5.

The charging and AP housing 110 comprises a charging and AP module 150, a running rail 120 (see FIG. 1), a first bottom plate 160, a circular gear 180, and a second bottom plate 170 having gear teeth 190 on a plane.

The charging and AP module 150 comprises a power source section 310, a charging section 320, an AP module 330 and a gear driving section 340. The charging section 320 charges the power source section 105 of the camera module 100 by supplying power to the power source section 105.

As described above, the charging section 320 charges the power source section 105 of the camera module 100 via the wireless or wired medium.

The AP module 330 establishes a wireless or wired network, and receives image information and residual power information of the power source section 105 of the camera module 100 from the communicating section 106 of the camera module 100 through the established wireless network. Since the wireless network is established, the AP module acts as an access point (AP).

The gear driving section 340 has a motor, generates rotation using the motor, and transmits the rotation to the circular gear 180.

The motor of the gear driving section 340 operates in response to a signal applied from the outside. In an embodiment, the motor operates by receiving a drive signal that the server 400 outputs after having determined the amount of residual power of the power source section 105 of the camera module 100.

The power source section 310 supplies power to the charging section 320, the AP module 330 and the gear driving section 340 via wired power lines, based on power over Ethernet (PoE) using local area network (LAN) lines, or a wireless medium.

Since the power source section 310 is connected to the server 400 via the wired network 411, the power source section 310 receives power from the server 400.

The running rail 120 is a rail that is positioned collinear with the rail 10 and positioned equal to the direction in which the rail 10 proceeds. The camera module 100 which moves along the rail 10 uses the running rail 120 when the camera module 100 moves through the charging and AP housing 110.

Returning to FIG. 1, a charging rail 130 is positioned between the running rail 120 and the charging and AP module 150. The charging rail 130 allows the camera module 100 which has been moving along the rail 10 to be positioned adjacent to the charging and AP module 150 so that the power source section 105 of the camera module 100 is charged.

The first bottom plate 160 is positioned at the bottom of the body of the charging and AP housing 110 which includes the charging and AP module 150, the running rail 120 and the charging rail 130. The first bottom plate 160 has the circular gear 180 which has a plurality of gear teeth formed along the circumference of a disk.

The second bottom plate 170 is positioned below and parallel to the first bottom plate 160. The second bottom plate 170 has a plurality of gear teeth 190 at positions corresponding to the gear teeth of the circular gear 180.

The plurality of gear teeth formed on the circular gear 180 of the first bottom plate 160 and the plurality of gear teeth formed on the flat surface of the second bottom plate 170 are positioned so as to engage with each other. When the circular gear 180 is driven, the circular gear 180 is configured to move along the plurality of gear teeth 190 formed on the flat surface of the second bottom plate 170.

The server 400 is connected to the charging and AP module 150 via the wired network 411 as described above, supplies power to the power source section 310, and receives the image information of the camera module 100 and the residual power information of the power source section 105 from the AP module 330.

The server 400 executes a series of processing, such as recognizing the registration number of a vehicle or determining a motion of an object, and stores processing results in a database which is positioned in the server 400.

The server 400 determines the amount of residual power of the power source section 105 of the camera module 100. If it is determined necessary to charge the power source section 105, the server 400 generates a motor drive signal and sends the motor drive signal to the gear driving section 340 of the charging and AP module 150.

The computer 500 is connected to the server 400 via the wired network 410, and has software dedicated to the parking management system. The software of the computer 500 accesses the database of the server 400, and provides a plurality of functions, such as reporting on a current parking situation, real-time monitoring, video image searching and playing, or searching for a specific vehicle.

The computer 500 may be provided as a plurality of computers which are connected to each other via the wired network 410.

In an embodiment, the server 400 can be connected to the charging and AP module 250 via the wired network 412.

With reference to FIG. 6A, FIG. 6B, FIG. 6C and FIG. 6D, a description will be given below of the operation of the parking management system using a rail according to an embodiment which has been described with reference to FIG. 1 to FIG. 5.

Figure 6:
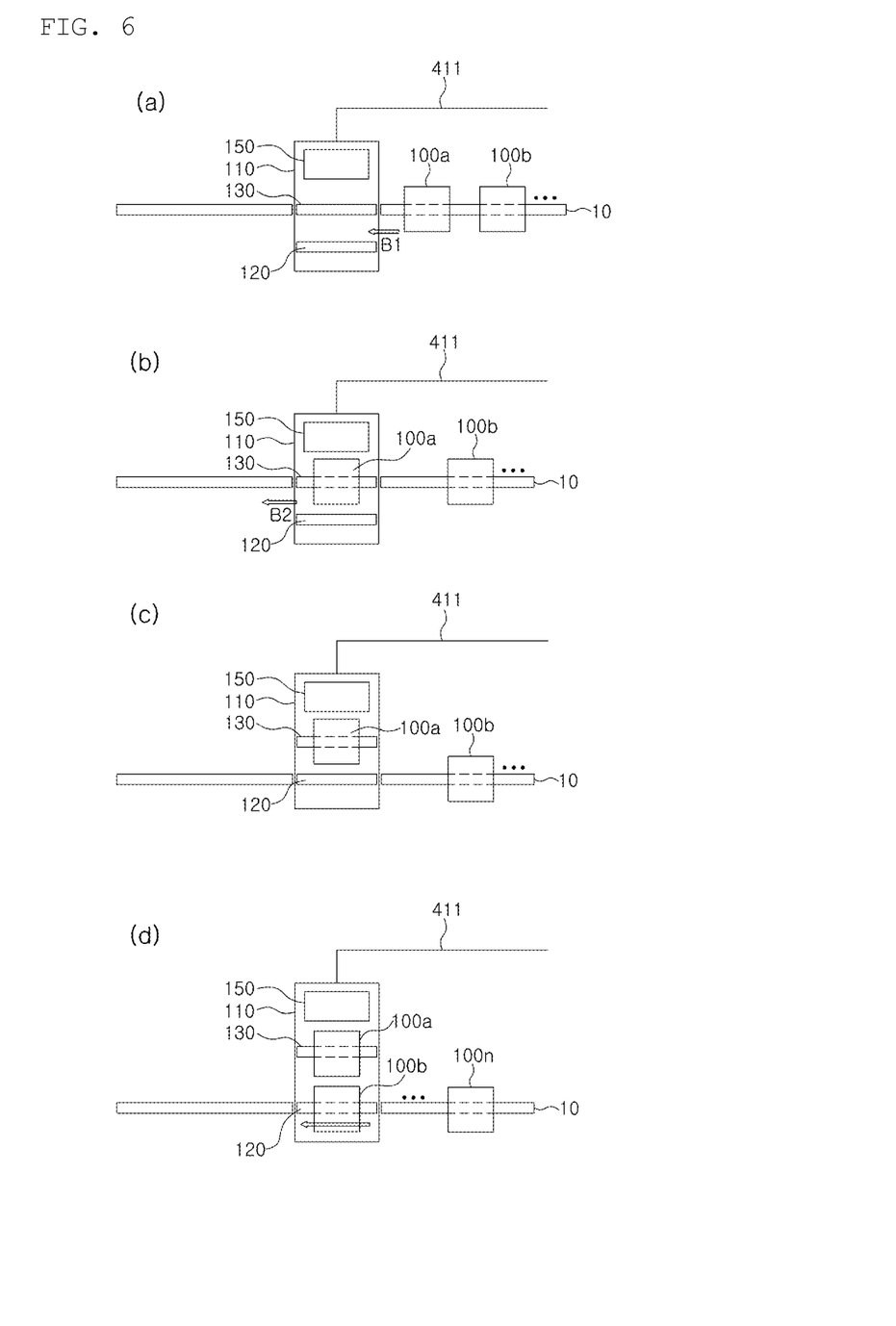
FIG. 6A, FIG. 6B, FIG. 6C and FIG. 6D are top-plan views showing charging and traveling of the camera according to an embodiment of the invention.

The server 400 generates a motor drive signal in order to charge the power source section of the camera module 100. The gear driving section 340 of the charging and AP module 150 operates in response to the motor drive signal received through the wired network 411, and the circular gear 180 is driven by the gear driving section 340.

The gear teeth of the circular gear 180 move along the plurality of gear teeth 190 formed on the second bottom plate 170. The first bottom plate 160 of the charging and AP housing 110 moves in the horizontal direction so as to be spaced apart from the second bottom plate 170, and arrives at a position shown in FIG. 6A. The charging rail 130 is positioned collinear with the rail 10.

In FIG. 6A, the camera modules 100a and 100b move in the direction of arrow B1 along the rail 10, one camera module 100a of the camera modules 100a and 100b passes through the inside of charging and AP housing 110 as shown in FIG. 6B along the charging rail 130. One camera module 100a is positioned adjacent to the charging and AP module 150, which then charges the power source section 105 of the camera module 100a using the charging section 320.

When the camera module 100a is positioned at the charging rail 130, the gear driving section 340 operates so that the circular gear 180 moves along the horizontal gear teeth 190, thereby moving the charging and AP housing 110 in the horizontal direction.

The direction in which the circular gear 180 proceeds and the direction in which the charging and AP housing 110 moves are respectively opposite to the direction in which the circular gear 180 proceeds and the direction in which the charging and AP housing 110 moves when the charging and AP housing 110 is set to the position shown in FIG. 6A. Consequently, the charging and AP housing 110 moves in the horizontal direction, and the running rail 120 is positioned collinear with the rail 10, as shown in FIG. 6C. Afterwards, the other camera module 100b which moves along the rail 10 passes through the inside of the charging and AP housing 110 along the running rail 120, as shown in FIG. 6D. When one camera module 100a is being charged, the other camera module 100b can take images from the parking area 1 while moving along the rail 10 and the running rail 120. This makes the efficiency of parking management satisfactory. The plurality of camera modules 100a, 100b, . . . and 100n take images from the parking area 1 while moving along the rail 10 and the running rail 120, and the power of the camera module 100 is charged through the charging rail 130. It is therefore possible to reduce installation cost compared to a conventional parking management system which has a plurality of fixed cameras.

Although embodiments of the invention have been described for illustrative purposes, those skilled in the art will appreciate that various modifications, additions and substitutions are possible, without departing from the scope and spirit of the invention as disclosed in the accompanying claims.

What is claimed is:

1. A parking management system, comprising:
a camera module, wherein the camera module comprises:
- a camera section which collects image information by taking images from a parking area while moving along a rail;
- a communicating section which receives the image information collected at the camera section and transmits the image information to an outside via a wireless network;
- a wheel driving section which includes a motor, the wheel driving section generating rotation using the motor and transmitting the rotation to wheels of the camera module; and
- a power source section which receives power from an outside source, stores the power, and supplies the power to the camera section, the communicating section or the motor of the wheel driving section, wherein the power is charged from the outside source;

a charging and access point housing, wherein the charging and access point housing comprises:
- a charging and access point module which comprises a charging section which charges the power source section of the camera module, an access point module which establishes a wireless network or a wired network and receives the image information from the communicating section of the camera module through the wireless network, a gear driving section which includes a motor, the gear driving section generating rotation using the motor and transmitting the rotation to a gear, and a power source section which supplies power to the charging section, the access point module and the motor of the gear driving section;
- a running rail positioned collinear with the rail; and
- a charging rail positioned between the charging and access point module and the running rail;

a server comprising a database, wherein the server receives the image information from the access point module of the charging and access point housing through the wired network, processes the received image information, and stores a result of the processing in the database; and at least one computer connected to the server, wherein the at least one computer contains management software which executes a parking situation search using the database of the server.

2. The parking management system according to claim 1, wherein the rail on which the camera section moves comprises a first planar portion parallel to a direction in which the camera module proceeds and a second planar portion connected perpendicularly to the first planar portion.

3. The parking management system according to claim 2, wherein the second planar portion is connected to a middle portion of the first planar portion.

4. The parking management system according to claim 2, wherein the rail further comprises a third planar portion connected perpendicularly to an edge of the second planar portion which is not connected to the first planar portion, the first and third planar portions being positioned parallel to each other.

5. The parking management system according to claim 2, wherein the wheels of the camera module are positioned to adjoin an upper surface of the first planar portion of the rail and both surfaces of the second planar portion of the rail.

6. The parking management system according to claim 2, wherein the camera module further comprises:
- a camera module support frame which comprises a middle planar portion and two outer planar portions connected perpendicular to the middle planar portion, wherein the camera module is mounted on an upper surface of the middle planar portion; and
- wheel connecting parts connected to one planar portion of the planar portions of the camera module support frame and the wheels, thereby fixing the wheels to the camera module support frame.

7. The parking management system according to claim 1, wherein the charging and access point housing comprises:
- a first bottom part positioned at a bottom of the charging and access point housing, wherein the first bottom part comprises a circular gear which has gear teeth on a circumference of a disk thereof; and
- a second bottom part positioned below the first bottom surface, wherein the second bottom surface comprises gear teeth formed on a planar surface thereof, the gear teeth of the second bottom surface corresponding to the gear teeth of the circular gear.

8. The parking management system according to claim 1, wherein
- the power source section of the charging and access point module supplies the power to the charging section, the access point module and the gear driving section via wired power lines, based on power over Ethernet (PoE) using local area network lines, or a wireless medium, and
- the charging section of the charging and access point module charges the power source section of the camera module via a wireless or wired medium.

* * * * *